Feb. 3, 1959   F. R. DRURY   2,871,712
INCREMENTAL MOTOR
Filed Sept. 23, 1955

INVENTOR:
Frank R. Drury
By Hubert E. Metcalf
His Patent Attorneys

United States Patent Office 2,871,712
Patented Feb. 3, 1959

2,871,712

INCREMENTAL MOTOR

Frank R. Drury, Hermosa Beach, Calif., assignor to Northrop Aircraft, Inc., Hawthorne, Calif., a corporation of California Application September 23, 1955, Serial No. 536,102

12 Claims. (Cl. 74—111)

The present invention relates to devices operated by electrical pulses and more particularly described as a stepper or incremental motor.

In some stepper motors it is necessary to provide structure which may be rotated very accurately a defined distance for each pulse and preferably is adapted to be rotated in one direction or the other or alternately in one direction and then the other, or in any combination thereof depending on the manner in which the electrical pulses are transmitted to the device.

Incremental motors are used to control accurately functioning mechanisms such as computing devices, electrical relay systems that may be found in communication equipment, servo systems and similar applicable structure.

Devices of the kind to which this invention relates, should also be so constructed that they may be readily incorporated in place of other previously used devices in a wide variety of equipment and should be readily adapted to the special needs of whatever type of equipment the device is to be used. In addition, the stepper motor should be capable of operating on the electrical power provided.

Therefore, the principal object of this invention is to provide an electrical pulse actuated incremental or stepper motor which can be operated very accurately for an extended period of time without danger of missing pulses.

Another object of this invention is to provide an electrical pulse actuated incremental or stepper motor capable of use in a wide variety of equipment, which may be actuated in one direction or the other, or alternately in one direction and then the other, or in any combination thereof.

Broadly the invention involves a bi-directional incremental motion stepper motor that may be energized by a force, preferably electrical, to cause an incremental motion. The motor may be energized to rotate in either one of two directions. Further, the incremental or stepper motor is provided with structure that insures that only one defined step of rotation is made at a time without there being inadvertent excess over-travel or reverse rotation.

Figure 1:
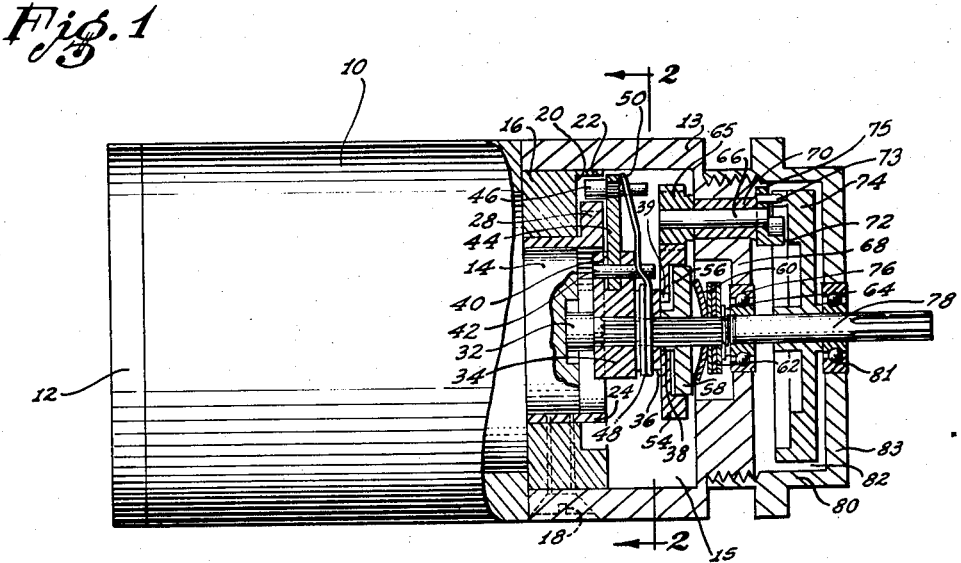
Figure 1 is a fragmentary cross-sectional view illustrating and having embodied therein the present invention, parts being broken away for purposes of clarity.

Referring to the drawings for a more detailed description of the present invention, 10 designates a cylindrical case having a removable end cap 12 threaded thereon and a D. C. single phase torque motor 14 therein.

The case 10, in combination with a cup 13 thereon, provides a chamber 15 into which the major portion of the structure to be described is located.

A cam ring 16, mounted rigidly in the case 10, circumscribes one end of the motor 14. Screws 18 secure the ring 16 and the cup 13 to the case 10. The ring 16 is provided with a groove 20, having a uniform width, which is defined, generally, by a pair of walls 22 and 24. A triangular shaped notch 26 that is in communication with groove 20 is formed in wall 22 and may be considered a recovery area for the cam on the pawl to be hereinafter more fully described.

Opposed to the apex 27 of the notch 26, integral with wall 24, and projecting into the groove 20, is a stop projection 28.

The various figures of the drawings illustrate one notch 26 and one projection stop 28. However, there may be as many recovery areas 26 and stops 28 in the ring 16 as is considered desirable.

Rotatably actuated by the imposed torque applied by motor 14 and extending therefrom into chamber 15 is a shaft 32 having that portion in chamber 15 serrated or fluted.

Freely rotatable about shaft 32 is a driver 34 that has integral therewith a pair of concentric hubs 36 and 38. The driver 34 is provided with a slot 40 and through the walls defining the slot extends a pin 42. It may be determined by referring to Figure 1 that the pin 42 extends beyond the driver 34 and extends over the hub 36.

The function of the pin 42 is that of a pivot for a link 44 rigidly mounted thereon. Projecting through or being integral with the link 44 is a cam or follower 46 that is received in the groove 20. When the driver 34 and link 44 are caused to rotate the cam or follower 46 is caused to follow the path of travel defined by the groove 20.

A spring 48 is coiled about hub 36 and integral with the former are a pair of arms 50 and 52. Arm 50 is located on one side and arm 52 is located on the other of pivot pin 42 and cam 46.

The driver 34, link 44, ring 16, and spring 48 may be defined as a "cam or follower means."

The hub 38 and projection 39, on hub 36, form a connection and are received in a cup shaped gear 54, and like the driver the gear is freely rotatable about the shaft 32.

Located in the gear 54 is a cork ring 56 which has bearing thereagainst a washer or ring 58. Urging the ring 58 into forceable engagement with the ring 56 is a wave washer 60 having a spacer or spacers 62 bearing thereagainst. The imposed force and spacers are retained on shaft 32 by a split lock washer 64.

The washer or ring 58, wave washer 60 and spacers 62 each have an opening centrally located therein and the wall defining the opening is complementary to the configuration of the serrated shaft 32. Due to this construction the ring 58, wave washer 60 and spacers 62 are free, within the limits of the applied force, to slide back and forth on the shaft 32 but are rotated therewith when the shaft rotates. On the other hand, the driver 34, gear 54 and cork ring 56 are freely rotatable about shaft 32. The size and number of spacers 62 may be varied in order to alter the tension imposed on ring 58.

The gear 54, cork ring 56, ring 58, washer 60, spacers 62, and split lock washer 64 may be considered a "frictional clutch." Additionally the structure just described from the motor 14 to the split lock washer may be broadly described as the "driving means."

Meshing with gear 54 is another gear 65 that is secured to a shaft 66. The bottom 68 of the cup 13 has a bearing 70 therein which supports and through which projects the shaft 66. A Geneva lock 72 and pin 73 are fixed to a collar 75 which is fixed to shaft 66. The lock and pin are in opposed relation to gear 65.

The Geneva lock 72 and pin 73 meshes with a Geneva wheel 74 to rotate and lock the same.

Centrally located in the bottom 68 is a bearing 76 that supports a driven shaft 78. This last mentioned shaft is, as may be determined by referring to Figure 1 of the drawings, in linear alignment with shaft 32. The Geneva wheel 74 is rigidly mounted on shaft 78 and causes the same to rotate. The Geneva lock 72 and pin 73 along with the Geneva wheel 74 and shaft 78 may be considered a "Geneva motion."

An end cup 80 threaded onto cup 13 provides a chamber 82 in which the Geneva motion is located. The bottom 83 of cup 80 has a bearing 81 centrally located therein that supports that end of the shaft 78 in opposed relation to bearing 76.

The shaft 78 is illustrated as being serrated on the free end, but need not be.

A broad definition for the structure between gear 64 and shaft 78 is "driven means."

Certain modifications may be made in the incremental motor. For instance, the gears 54 and 65 are illustrated as having a two to one ratio. This ratio may be increased or decreased depending on the condition prevailing. Further, the Geneva motion may be dispensed with and instead a gear train may be substituted therefor. An example of this last modification would be to utilize meshing gears 54 and 65. The motion of these gears could be transmitted through shaft 66 to a gear identical to gear 65. The motion would then be transmitted to a gear identical to gear 54 and through the shaft 78. Additionally the friction clutch may be subjected to certain changes and alterations.

Figure 5:
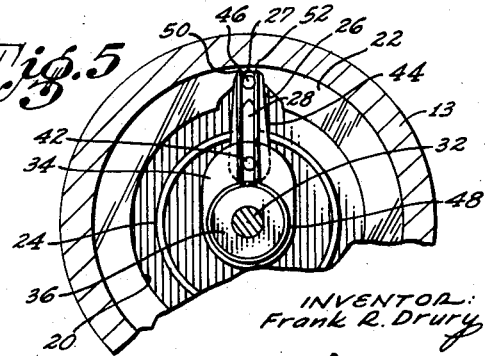
Figure 5 is a view similar to Figures 2-4 inclusive but illustrating the essential structure at the completion of a cycle of rotation and in position to be cycled again.

The operation of the invention is as follows: Assume the various elements of the incremental or stepper motor to be in the position illustrated in Figures 1 and 5.

An electrical pulse is applied to the motor 14 to cause the same to rotate counter-clockwise as shown, and apply a torque to shaft 32. This torque or rotation is transmitted to the spacers 62, wave washer 60, and washer or ring 58, all of which constitute a portion of a friction clutch. Under the urging of the immediately preceding elements the washer 58 is caused to bear against the cork ring 56, also a part of the friction clutch. The force applied results in causing gear 54 to rotate. Rotation of the gear is transmitted to the driver 34 which begins its rotation in a counter-clockwise direction. The result is that the rotation is further transmitted to the link 44 and cam 46 to pull the latter from the notch 26 to the position illustrated in Figure 2.

It is to be noted that the two arms 50 and 52 are distended with arm 50 bearing against pivot pin 42 and arm 52 bearing against cam 46. Continued rotation of the aforementioned elements results in the driver 34, link 44 and cam 46 assuming the position illustrated in Figure 3 of the drawings.

Figure 4:
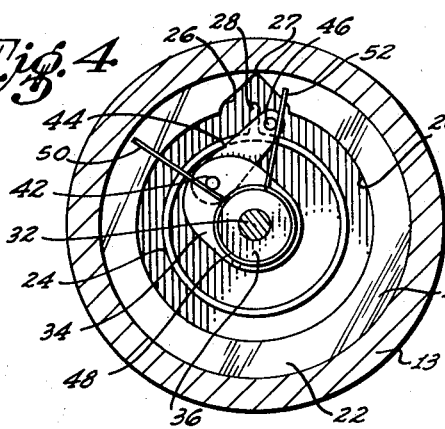
Figure 4 is a view similar to Figures 2 and 3 but illustrating the essential structure at the completion of a cycle of rotation and against a stop.

Figure 4 illustrates a complete counter-clockwise cycle of the elements involved with cam 46 being in engagement with the stop projection 28.

If the electrical pulse imposed on the motor does not cease at the same time as the cam 46 engages the stop 28, an effort is made by the friction clutch, constituting the spacers 62, wave washer 60, ring 58 and cork ring 56, to force the cam 46 and related structure to cycle again. This continued urging only results in bringing the cam 46 into a more forceful engagement with the stop 28. Further, due to the resistance of the driver 34, link 44 and cam 46, the gear 54 is prevented from rotating and the friction clutch slips. As a result the driver 34, link 44, cam 46 and gear 54 rotate but one cycle and no more.

As soon as the electrical pulse ceases and force is no longer being applied to the driver 34, link 44 and cam 46, the arms 50 and 52 of the spring tend to draw toward each other. But due to the stop 28, the arm 50 reverses the rotation of the driver 34 and the cam 46 is projected into the slot or recovery area 26.

The structure described has completed a cycle of operation and may again be rotated in a counter-clockwise or clockwise direction.

Figure 2:
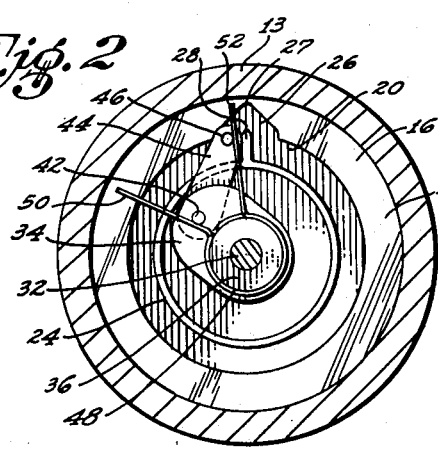
Figure 2 is a cross-sectional view taken transverse to the longitudinal axis on line 2—2 of Figure 1 and illustrating certain essential structure in an initial stage of operation.
Figure 3:
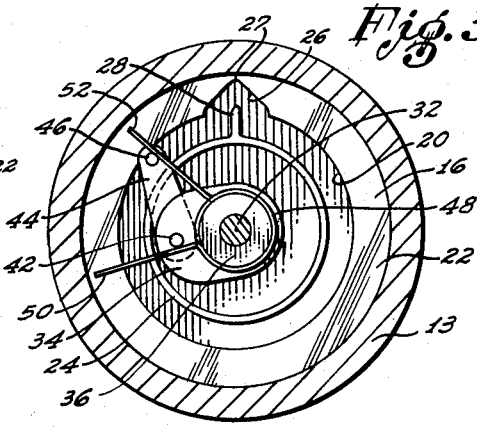
Figure 3 is a view similar to Figure 2 but illustrating the essential structure in a more advanced stage of operation.

Now assume the incremental motor and particularly the driver 34, link 44 and cam 46 to be in the position illustrated in either one of Figures 2, 3 or 4.

An electrical pulse has been transmitted to cause counter-clockwise rotation but before the cycle of rotation is completed a pulse is imposed to cause clockwise rotation.

Due to the configuration of the groove 20 the driver 34, link 44 and cam 46 can not change positions. As a result the driver 34, link 44, and cam 46 rotate clockwise retaining the positions illustrated. Instead of the cam 46 engaging the stop 28 it is projected into and out of the notch 26 and continues to complete a clockwise cycle of rotation.

Returning to the operation of the counter-clockwise rotation, the gear 54 being in meshing engagement with gear 65 results in the rotation of the former being transmitted through the Geneva motion and to the driven shaft 78.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An incremental motion control comprising a driving shaft, to which torque is applied to cause rotation thereof; a spring loaded and connected driver means, link, and cam on and freely rotatable about said shaft; frictional means on said shaft that is interconnected to said driver for rotating said driver, cam, and link when said shaft is rotated; stop and cam ring means engaged by said cam, to define and limit the path of rotation of said cam, link, and driver; and driven means interconnected to said driver and rotatable therewith; and at least one recovery area in said cam ring into which said cam is projected when the torque is removed from said shaft.

2. An incremental motion control comprising a driving shaft, to which torque is applied to cause rotation thereof; a spring loaded and connected driver means, link, and cam on and freely rotatable about said shaft; frictional means on said shaft that bears against said driver means for rotating the driver means, link, and cam when said shaft is rotated; stop and cam ring means engaged by said cam, to define and limit the path of rotation of said cam, link, and driver means; driven means interconnected to said driver means and rotatable therewith; and at least one recovery area in said cam ring into which said cam is projected.

3. An incremental motion control comprising a driving shaft, to which torque is aplied to cause rotation thereof; a spring loaded cam means on and freely rotatable about said shaft; frictional means on said shaft that bears against said cam means to rotate the latter when said shaft is rotated; a cam ring that receives said cam means for the purpose of directing the path of rotation of said cam means; a stop on said ring against which the cam means is rotated to limit the path of travel of said cam means; driven means interconnected to said cam means, and rotatable therewith; and at least one recovery area in said cam ring into which said cam means is projected.

4. An incremental motion control comprising a driving shaft, to which torque is applied to cause rotation thereof; a spring loaded and connected driver means, link, and cam on and freely rotatable about said shaft; frictional means on said shaft that is interconnected to said driver means for rotating said driver means, cam, and link when said shaft is rotated; stop and cam ring means engaged by said cam; and driven means interconnected to said driver means and rotatable therewith; and at least one recovery area in said cam ring into which said cam is projected; said cam stop and recovery area being in opposed relationship to each other.

5. An incremental motion control comprising a driving shaft, to which torque is aplied to cause rotation thereof; a spring loaded driver means, cam, and link on and freely rotatable about said shaft; frictional means on said shaft that bears against said driver means for rotating the driver means, cam, and link when said shaft is rotated; stop and cam ring means engaged by said cam, to define and limit the path of rotation of said cam, link, and driver means; driven means interconnected to said driver means and rotatable therewith; and at least one recovery area in said cam ring into which said cam is projected; said cam stop and recovery area being in opposed relationship to each other.

6. An incremental motion control comprising a driving shaft, to which torque is aplied to cause rotation thereof; a spring loaded cam means on and freely rotatable about said shaft; frictional means on said shaft that bears against said cam means to rotate the later when said shaft is rotated; a cam ring that receives said cam means for the purpose of directing the path of rotation of said cam means; a stop on said ring against which the cam means is rotated to limite the path of travel of said cam means; driven means interconnected to said cam means, and rotatable therewith; and at least one recovery area in said cam ring into which said cam means is projected; said cam stop and recovery area being in opposed relationship to each other.

7. An incremental motion control comprising a driving shaft, to which torque is applied to cause rotation thereof; a spring loaded driver means, cam, and link on and freely rotatable about said shaft; frictional means on said shaft that is interconnected to said driver means for rotating said driver means, cam, and link when said shaft is rotated; stop and cam ring means engaged by said cam to define and limit the path of rotation of said cam, link, and driver means; and driven means interconnected to said driver means and rotatable therewith; and at least one recovery area in said cam ring into which said cam is projected; said cam ring being a ring having a groove therein into which projects said cam.

8. An incremental motion control comprising a driving shaft, to which torque is applied to cause rotation thereof; a spring loaded driver means, cam, and link on and freely rotatable about said shaft; frictional means on said shaft that bears against said driver means for rotating the driver means, cam, and link when said shaft is rotated; stop and cam ring means engaged by said cam, to define and limit the path of rotation of said cam, link, and driver means; driven means interconnected to said driver means and rotatable therewith; and at least one recovery area in said cam ring into which said cam is projected; said cam ring being a ring having a groove therein into which projects said cam.

9. An incremental motor control comprising a driving shaft, to which torque is applied to cause rotation thereof; a spring loaded cam means on and freely rotatable about said shaft; frictional means on said shaft that bears against said cam means to rotate the latter when said shaft is rotated; a cam ring that receives said cam means for the purpose of directing the path of rotation of said cam means; a stop on said ring against which the cam means is rotated to limit the path of travel of said cam means; driven means interconnected to said cam means, and rotatable therewith; and at least one recovery area in said cam ring into which a portion of said cam means is projected; said cam ring being a ring having a groove therein into which projects said cam means.

10. An incremental motion control comprising a driving shaft, to which torque is applied to cause rotation thereof; a spring loaded driver means, cam, and link on and freely rotatable about said shaft; frictional means on said shaft that is interconnected to said driver means for rotating said driver means, cam, and link when said shaft is rotated; stop and cam ring means engaged by said cam; and driven means interconnected to said driver means and rotatable therewith; and at least one recovery area in said cam ring into which said cam is projected; said recovery area being a notch formed in said cam ring.

11. An incremental motion control comprising a driving shaft, to which torque is applied to cause rotation thereof; a spring loaded driver means, cam, and link on and freely rotatable about said shaft; frictional means on said shaft that bears against said driver means for rotating the driver means, cam, and link when said shaft is rotated; stop and cam ring means engaged by said cam to define and limit the path of rotation of said cam, link, and driver means; driven means interconnected to said driver means and rotatable therewith and at least one recovery area in said cam ring into which said cam is projected when the torque is removed from said shaft; said recovery area being a notch formed in said cam ring.

12. An incremetal motion control comprising a driving shaft, to which torque is applied to cause rotation thereof; a spring loaded cam means on and freely rotatable about said shaft; frictional means on said shaft that bears against said cam means to rotate the latter when said shaft is rotated; a cam ring that receives said cam means for the purpose of directing the path of rotation of said cam means; a stop on said ring against which the cam means is rotated to limit the path of travel of said cam means; driven means interconnected to said cam means, and rotatable therewith; and at least one recovery area in said cam ring into which a portion of said cam means is projected; said recovery area being a notch formed in said cam ring.

References Cited in the file of this patent

UNITED STATES PATENTS

| | | |
|---|---|---|
| 772,067 | Sundh | Oct. 11, 1904 |
| 815,578 | Brown | Mar. 20, 1906 |
| 1,577,757 | ReQua | Mar. 23, 1926 |
| 1,891,101 | Le Count | Dec. 13, 1932 |
| 2,369,690 | Roth | Feb. 20, 1945 |
| 2,762,884 | Van Eyk | Sept. 11, 1956 |
| 2,810,302 | James et al. | Oct. 22, 1957 |